United States Patent [19]

Brower

[11] Patent Number: 4,542,559
[45] Date of Patent: Sep. 24, 1985

[54] METHOD FOR FILLETING FISH

[75] Inventor: Ben C. Brower, Gladstone, Mich.

[73] Assignee: A. W. Manufacturing Inc., Gladstone, Mich.

[21] Appl. No.: 651,217

[22] Filed: Sep. 14, 1984

Related U.S. Application Data

[62] Division of Ser. No. 282,023, Jul. 10, 1981, Pat. No. 4,484,375.

[51] Int. Cl.⁴ ............................................. A22C 25/16
[52] U.S. Cl. .......................................... 17/46; 17/52; 17/57
[58] Field of Search ................... 17/46, 52, 53, 56, 57, 17/58, 59, 61

[56] References Cited

U.S. PATENT DOCUMENTS 2,917,772 12/1959 Schlichting ............................... 17/55
3,303,526 2/1967 La Pine et al. ...................... 17/46 X
4,236,275 12/1980 Westerdahl .......................... 17/57 X Primary Examiner—Willie G. Abercrombie
Attorney, Agent, or Firm—Andrus, Sceales, Starke & Sawall

[57] ABSTRACT

A fish filleting machine using the anal fin for guiding fish over belly cutting blades, a belly cleaning wheel and past backbone and rib removal blades. The machine includes a spring loaded belly positioning assembly at the belly cut area for ending the cut at the anal fin. A guide horse in the belly cleaning area of the machine has an inclined plane which properly positions the belly of the fish at the correct height for cleaning irrespective of fish size. The fish are presented to the backbone and rib removal blades at an oblique angle to produce an angled cut for minimum meat loss. A rib pick-up assembly in the boning area utilizes the ribs of the fish to guide the fish from the backbone removal blades to the rib removal blades. A method of filleting the fish is also described.

6 Claims, 18 Drawing Figures

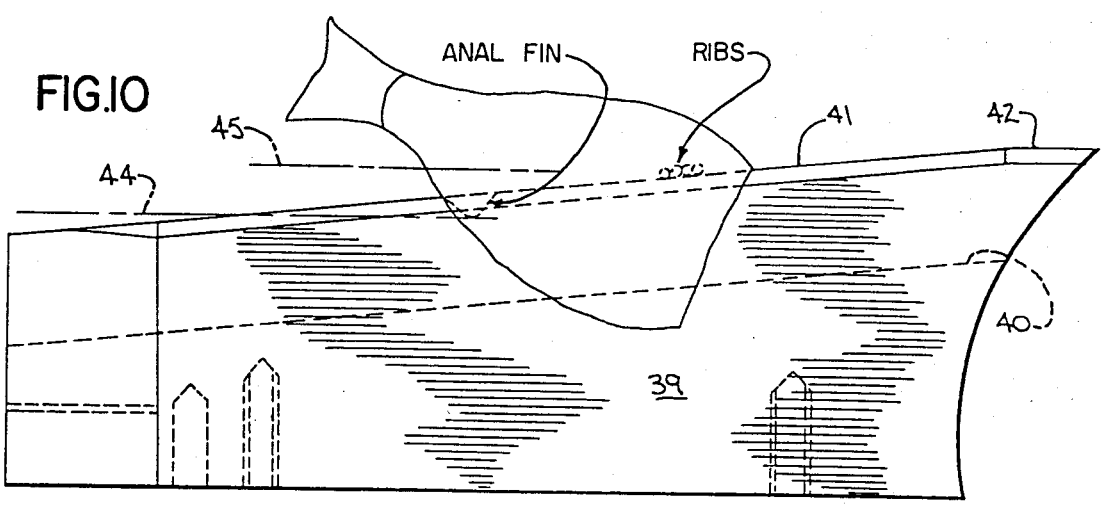
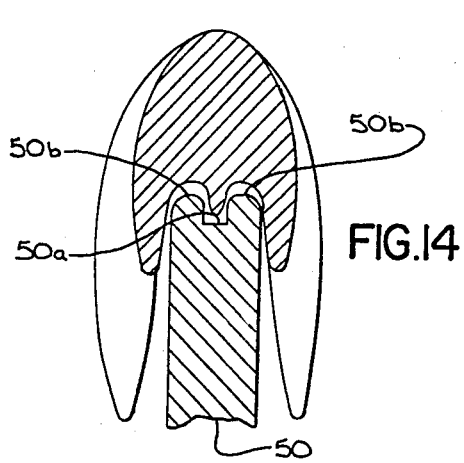
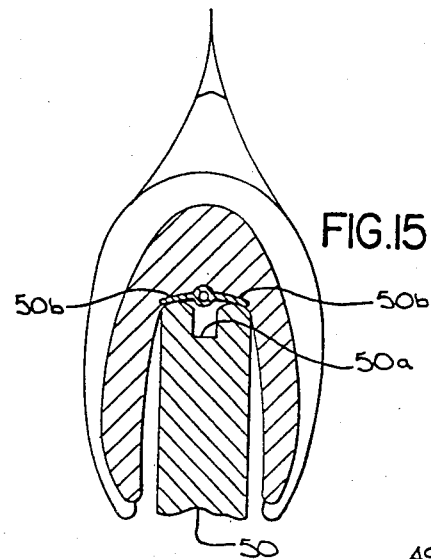
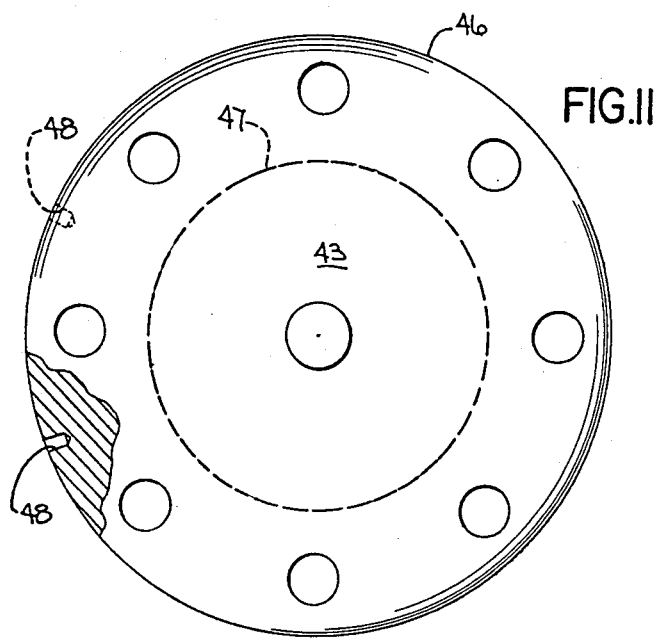
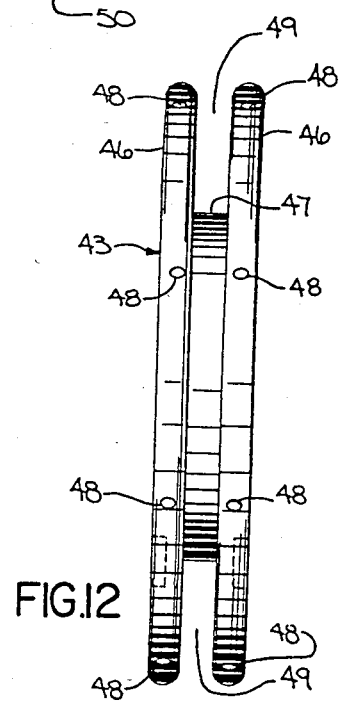

METHOD FOR FILLETING FISH

This is a division of application Ser. No. 06/282,023 filed July 10, 1981 now U.S. Pat. No. 4,484,375.

BACKGROUND OF THE INVENTION

The present invention relates to fish processing and more particularly to a method and apparatus for cleaning and filleting fish.

Various types of automatic machines have been developed for cleaning and filleting fish. These fish filleting machines include various mechanisms for removing the viscera, bones and undesirable belly meat. See for example U.S. Pat. Nos. 3,902,222, 3,955,242, 4,008,509, 4,056,866 and 4,236,275. A machine such as that shown in Cooper, U.S. Pat. No. 1,267,850 cuts open the belly and then utilizes entrail wiping brushes to eviserate the fish. Brushes, however, are difficult to clean and may transport contaminants from one fish to other successive fish. Another machine, such as that shown in Oates, U.S. Pat. No. 3,469,278 utilizes a pair of angle cleaning wheels to eviserate fish. The cleaning wheels in Oates have rounded teeth to avoid tearing the surface of the belly cavity. However, due to the difficulty of properly positioning different size fish with respect to cleaning and cutting devices, meat loss problems have remained. Meat loss problems are especially acute on machines for filleting fish such as cod, pollack and whiting since it is necessary to remove not only their backbone and ribs, but also their pinbones and belly meat.

More recent machines have been developed that incorporate sophisticated electronic controls for controlling the position of cleaning and cutting devices with respect to the fish being processed within the machine. However, such machines are expensive to manufacture, difficult to start up, and expensive to maintain.

SUMMARY OF THE INVENTION

The present invention provides an improved and simplified method and apparatus for cleaning and filleting fish. The invention provides means for locating the fish at an oblique angle of presentation to produce shank fillets free of bones and undesirable belly meat with a minimum of meat loss.

The apparatus includes a pair of spaced apart belly cutting blades for making a pair of belly cuts in the fish on opposite sides of the anal fin. A belly guide means utilizes these twin belly cuts along with the anal fin to centrally locate and properly orientate the belly of the fish to a cleaning wheel for eviscerating the fish. The belly guide means also forms an inclined plane so that the fish are properly positioned at the correct height for the cleaning irrespective of fish size.

A spring-loaded belly positioning means located upstream from the belly blades in the belly cut area ends the belly cuts at the anal fin to minimize meat loss. The fish are thus presented by the belly guide means to the cleaning wheel and rib removal blades at an oblique angle to the conveying path. This oblique angle of presentation controls the depth of the cleaning wheel and provides for an angled cut by the rib removal blades for minimal meat loss. The geometry of the backbone removal blades enables them to "ride" down the backbone insuring no meat loss.

In other aspect of the invention a rib pick-up assembly in the boning area supports the split fish portions from the backbone removal blades by means of their respective sets of ribs. The split portions are thus positioned at the desired angle for cutting by the rib removal blades.

A method of filleting fish is also disclosed comprising the steps of making a pair of belly cuts extending longitudinally of the fish body on either side of the anal fin, positioning the fish at an oblique angle of presentation, cleaning the viscera from the belly of the fish, making a pair of backbone cuts through the ribs on either side of the fish backbone to form a pair of individual fish portions, and making a rib cut through the side of each fish portion above the ribs to provide a pair of shank fillets.

Other objects and advantages will appear during the course of the following description.

BRIEF DESCRIPTION OF THE DRAWINGS

The drawings illustrate the best mode presently contemplated of carrying out the invention.

In the drawings:

FIG. 10 is a side view in elevation of a belly guide horse for use with the filleting machine of FIG. 1 showing the position of a fish thereon;

FIG. 11 is a side view in elevation with parts broken away of a cleaning wheel for use in the filleting machine of FIG. 1;

FIG. 12 is an end view of the cleaning wheel of FIG. 11;

FIG. 14 is a view in section taken along the plane of the line 14—14 in FIG. 13;

FIG. 15 is a view in section taken along the plane of the line 15—15 in FIG. 13;

DESCRIPTION OF THE PREFERRED EMBODIMENT

Figure 1:
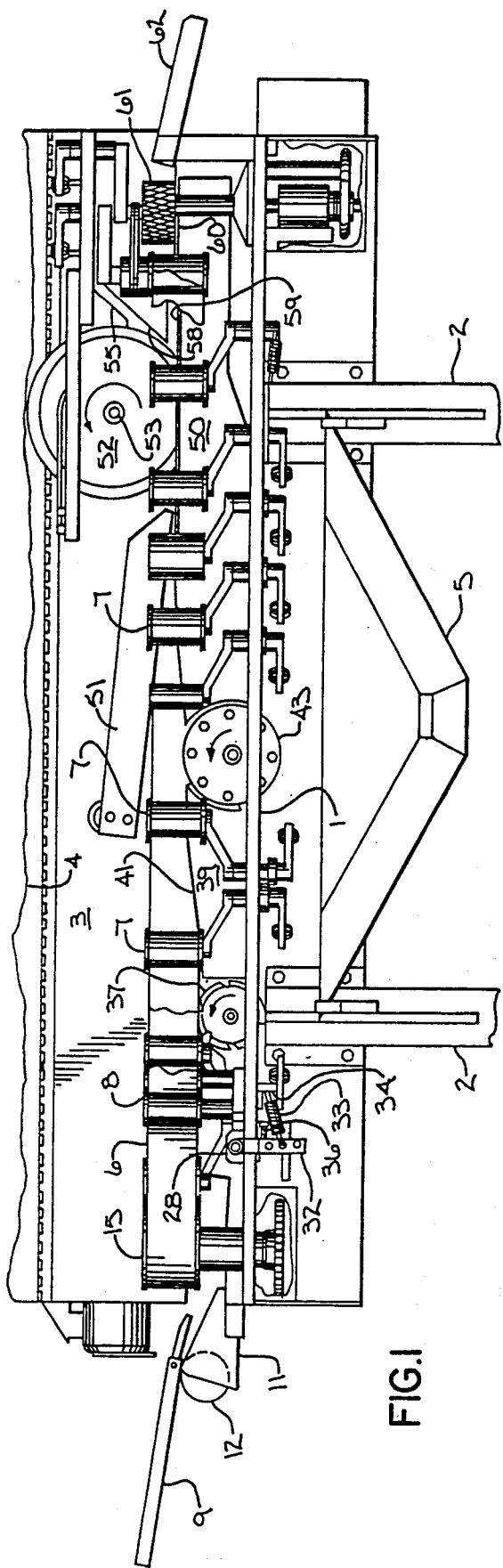
FIG. 1 is a side view in elevation of a fish filleting machine illustrating the preferred embodiment of the present invention.
Figure 2:
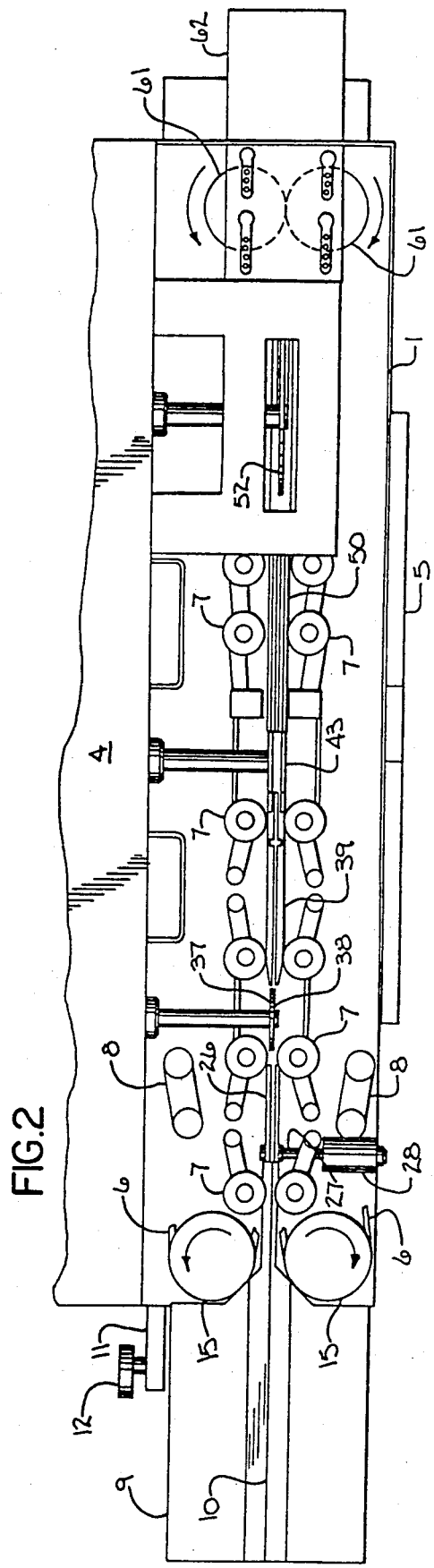
FIG. 2 is a plan view of the fish filleting machine shown in FIG. 1.

Referring now to the drawings, FIGS. 1 and 2 show a fish filleting machine constituting a preferred embodiment of the present invention. The filleting machine includes a frame 1 supported by a pair of legs 2 having a plurality of work-performing elements housed within an enclosure thereon. The enclosure is generally defined by a rear wall 3, the frame 1, and a cover 4 hingedly mounted to the top of rear wall 3. The filleting machine also includes a trough 5 beneath frame 1 and between legs 2 for collecting waste material from the fish as they are being processed. A pair of feed conveyor belts 6 extend along the length of the machine and are used to transport the fish along a conveying path to the various work-performing elements of the machine. The belts 6 are driven in a conventional manner and are positioned and controlled by a plurality of spring-loaded rollers 7 as will hereinafter be described. The tension of each conveyor belt 6 is controlled by a set of belt tightening rollers 8 in a conventional manner.

Figure 3:
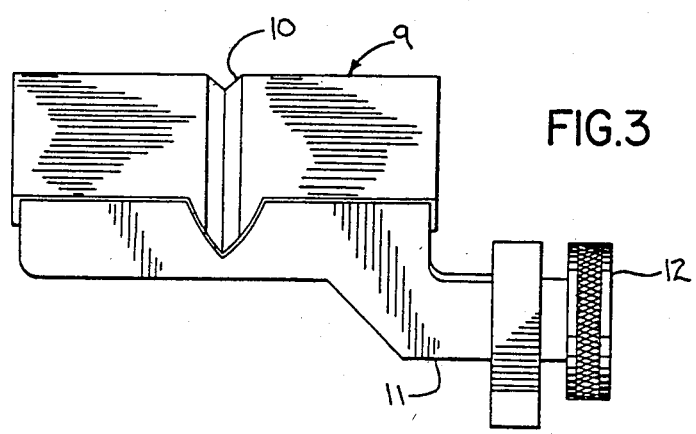
FIG. 3 is an end view of a feed tray for use with fish having their bellies intact.

A feed tray 9 is positioned at the inlet or left side, as seen in FIG. 1, of the machine which positions the fish for feeding into belts 6. Feed tray 9 shown in FIGS. 1-3 is used for fish having their bellies intact and for this purpose includes a V-cut 10 formed therein. V-cut 10 receives the belly of the fish so that the fish is fed belly-side-down and head end leading into belts 6. Feed tray 9 is supported by a bracket 11 on frame 1, and also includes an adjusting knob 12 so that feed tray 9 may be inclined toward belts 6.

Figure 4:
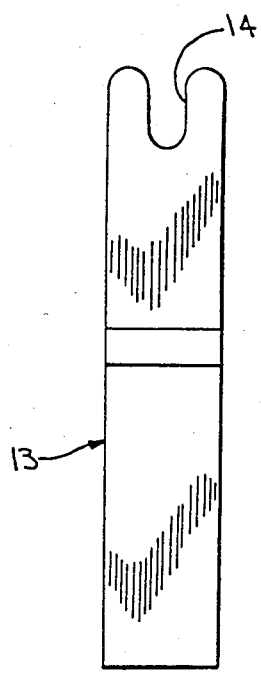
FIG. 4 is an end view showing an alternate feed tray for use with gutted fish.

An alternate feed tray 13 is shown in FIG. 4 which is interchangeable with feed tray 9. Feed tray 13 is used with gutted fish and therefore is much narrower than feed tray 9, so that the belly flaps may straddle its top edges. Feed tray 13 includes a groove 14 formed along its top for receiving the tail and anal fin to guide the fish straight toward the feed belts 6.

Figure 5:
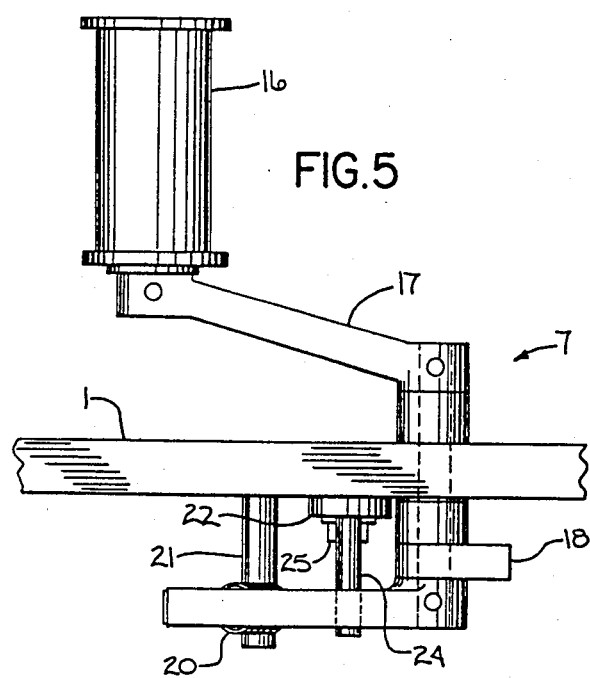
FIG. 5 is a side view in elevation of a roller stop assembly for use in the filleting machine of FIG. 1.
Figure 6:
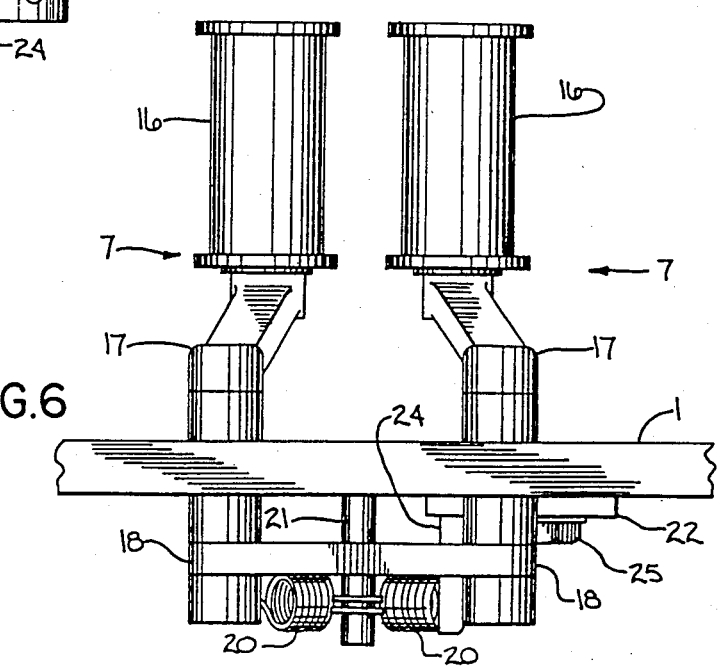
FIG. 6 is an end view of the roller stop assembly of FIG. 5.
Figure 7:
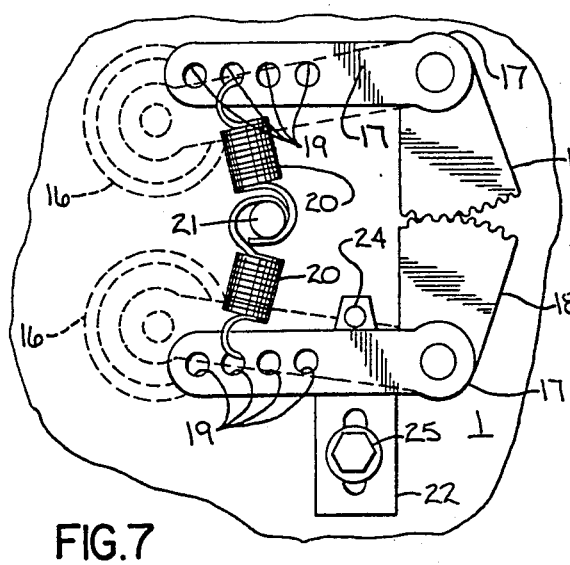
FIG. 7 is a bottom view of the roller stop assembly of FIG. 5.

The filleting machine of the present invention is preferably utilized with fish that have been headed, but not eviscerated. Thus, an operative places the "head-off" fish on feed tray 9 and between a pair of feed rollers 15 which carry the fish into the feed belts 6. Feed belts 6 then transport the fish over a spring-loaded belly positioning assembly shown in FIGS. 8 and 9 which works in conjunction with a roller-stop assembly shown in FIGS. 5-7. The set of rollers 7 shown in FIGS. 5-7 are of a conventional design and comprise belt positioning means for biasing the belts 6 toward one another. Each roller 7 includes a cylindrical spool 16 rotatably mounted on the upper arm of a U-shaped member 17. Member 17 is rotatable mounted on frame 1 of the machine and includes a toothed gear 18 which meshes with the gear of the corresponding roller 7. The lower arm of member 17 includes a plurality of openings 19 formed thereon, as seen in FIG. 7. One end of a coil spring 20 is looped through one of the openings 19 with its other end looped around a stationary peg 21 mounted dependingly from undersurface of frame 1. The position of spring 20 is adjustable between the openings 19 and peg 21 to vary the amount of pressure applied by spools 16 against belts 6. As shown in FIG. 7, the gears 18 enable spools 16 to act in tandem to ensure equal movement for both rollers on either side of the center line of the machine.

As best seen in FIG. 7, one of the rollers 7 includes an adjustable roller stop assembly for controlling the "at rest" distance between spools 16 and consequently between belts 6. The stop assembly includes a bracket 22 having an elongated opening 23 formed therein at one end and a stop member 24 projecting from its other end. Bracket 22 is mounted to the undersurface of frame 1 by bolt 25 so that stop number 24 engages the inner side of the lower arm of member 17. Thus, the "at rest" distance between spools 16 can be controlled by changing the position of stop member 24. For example, when stop member 14 is in the position of FIG. 7, spools 16 will have an "at rest" position as shown in FIG. 6. However, if stop member 24 is adjusted upwardly as seen in FIG. 7, the "at rest" distance between spools 16 will decrease. If stop member 24 is adjusted downwardly as seen in FIG. 7 the "at rest" distance between spools 16 will increase. Stop member 24 is preferably positioned so that rollers 7 are "at rest" a distance smaller than the front body width of the fish being processed, but greater than the width of the tail end of the body where it begins to narrow behind the anal fin. The importance of the roller stop position or "at rest" distance between spools 16 will be more fully understood after the following descripttion of the belly positioning assembly.

Figure 8:
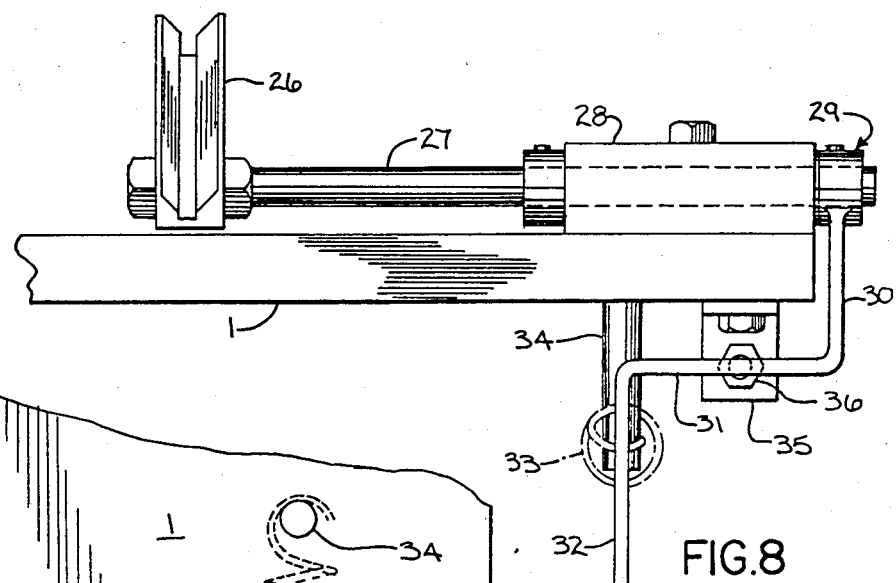
FIG. 8 is an end view of a spring-loaded belly positioning assembly for use in the filleting machine of FIG. 1.
Figure 9:
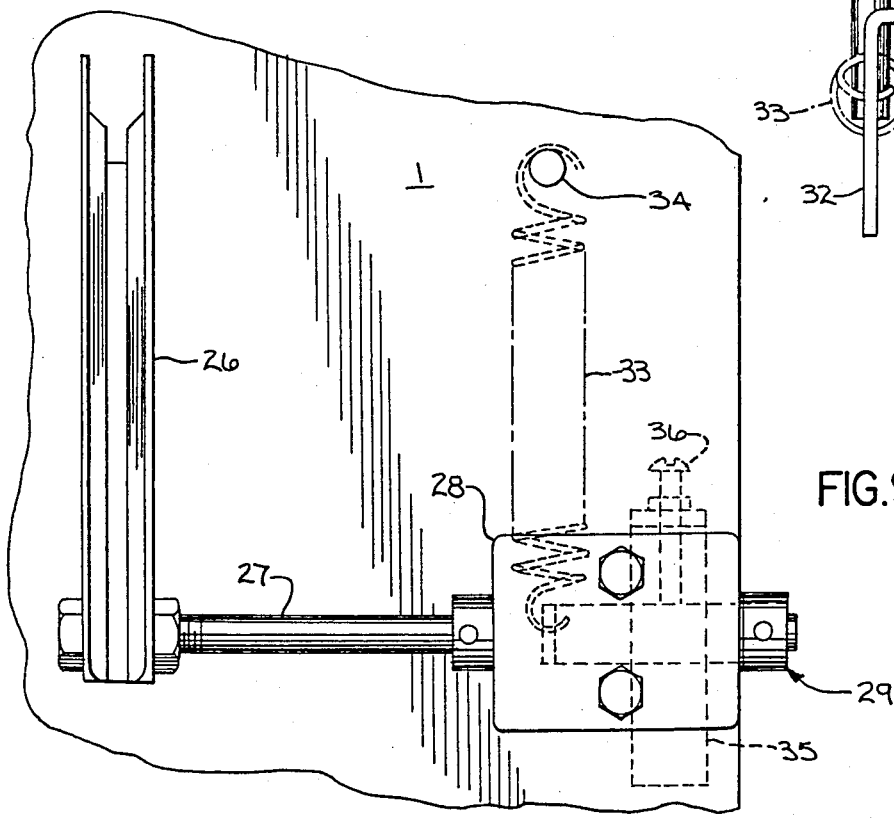
FIG. 9 is a plan view of the belly positioning assembly of FIG. 8.

The positioning assembly is shown in FIGS. 8 and 9, and includes an elongated trough-shaped lifting member 26 mounted at one end to a shaft 27. Lift member 26 extends longitudinally in the direction of travel of the fish, i.e. along the conveying path, and includes a V-shaped groove thereon. Shaft 27 extends transversely with respect to the conveying path and is rotatably mounted within housing 28 which in turn is bolted to the top of frame 1. A lever 29 is mounted on shaft 27 at the end opposite from that of lifting member 26 and includes an upper portion 30 extending downwardly along the edge of frame 1, a middle portion 31 extending beneath frame 1 and a lower portion 32 extending downwardly from the middle portion 31. One end of a coil spring 33 is looped around a peg 34 mounted dependingly from the undersurface of frame 1, and the other end of spring 33 is looped through an opening formed in the lower portion 32 of lever 29. Thus, spring 33 provides tension on lever 29 so that the free end of lifting member 26 is tilted upwardly into the conveying path in the position as shown in FIG. 8.

The belly positioning assembly also includes a means for adjusting the "at rest" position of lifting member 26. This adjusting means includes an L-shaped bracket 35 bolted to the undersurface of frame 1 and an adjusting screw 36 extending through the downwardly projecting portion of bracket 35 so that its shank end engages the middle portion 31 of lever 29. Thus, by turning or backing off screw 36 the "at rest" position of lifting member 26 may be adjusted. For example, if screw 36 is turned down into bracket 35 to move the middle portion 31 of lever 29 downwardly as seen in FIG. 9, the free end of lifting member 26 will be lower than that shown in FIG. 8. In contrast, if screw 36 is backed off out of bracket 25, or upwardly from the position as seen in FIG. 9, the free end of lifting member 26 will be higher than that shown in FIG. 8.

As previously noted, the roller stop position is set so that rollers 7 are at rest a distance smaller than the width of the head end of the fish being processed, but greater than the width of the tail. Thus, as belts 6 carry the fish to the spring-loaded belly positioning assembly, the front of a fish will be held by rollers 7 and will depress lifting member 26 and ride over a pair of belly blades 37 (See FIGS. 1 and 2) and the belly will be cut open. When the tail of the fish is in position over lifting member 26, rollers 7 will come to rest at their stop or at rest position and will therefore no longer be in contact with the fish. The tail of the fish will then be free in the belts 6. As a result, the spring-loaded lifting member 26 will raise the tail of the fish. The action of raising the tail raises the belly of the fish and ensures that the belly cut made by belly blades 37 finishes at the anal fin. Finishing the cut at the anal fin is important because unnecessary meat loss occurs if the belly cut extends beyond the anal fin, as will hereinafter be understood.

The twin belly blades 37 are positioned to make two cuts at a predetermined distance apart on either side of the anal fin. This distance may be adjusted by a spacer 38 located between the blades, as seen in FIG. 2. The predetermined spacing of the blades 37 is determined by the size of the fish being processed.

After the belly cut is made, the fish is then transported by feed belts 6 to a belly guide means located downstream of the belly blades 37. The belly guide means centrally locates the belly of the fish along the conveying path and comprises a guide horse 39 in the form of a narrow ramp-like support structure mounted on frame 1 extending longitudinally along the conveying path. As seen in FIG. 10, the top of horse 39 has a groove 40 formed therein at its upstream end and slopes upwardly to provide an inclined plane 41 with respect to the direction of travel of the fish or conveying path. The inclined plane 41 leads to a landing 42 at the downstream end of horse 39. After the belly is cut open by the twin belly blades 37, the fish will be transported downstream by the belts 6 onto guide horse 39, as shown in FIG. 10, with the upper surface of horse 39 extending into the belly of the fish. The anal fin will be located in groove 40 as shown in FIG. 10 and the ribs located on its top edge as shown. This tracking or guiding action of the anal fin in groove 40 and the ribs on the top edge of horse 39 centrally locates the fish at an oblique angle of presentation to a cleaning wheel 43, which will hereinafter be described.

The purpose of an inclined plane 41 is to locate the fish backbone irrespective of fish size at the level of landing 42 which is the correct height for cleaning. As shown in FIG. 10, the backbone of a smaller fish leaving the belly cutting blades 38 will approach guide horse 39 along the line of travel represented by the line 44 whereas the backbone of a larger fish will approach substantially along the line 45. Nevertheless, each fish as it is transported along guide horse 39 by feed belts 6, will end up or finish at the same cleaning height on landing 42. Thus, the inclined plane 41 of guide horse 39 provides a means for properly positioning the belly of a fish at a correct height for cleaning irrespective of fish size.

Once positioned on landing 42 of guide horse 39, the fish will be transported by feed belts 6 over cleaning wheels 43, which is shown in FIGS. 11 and 12. Wheel 43 will remove any offal or viscera from the belly of the fish up to the end of the belly cuts, and rotates counter-clockwise, as shown in FIG. 1. Wheel 43 includes a pair of spaced apart cleaning members 46 connected together by a central hub 47. Cleaning members 46 are preferably disc-shaped with their radially outer edges rounded, and each includes a plurality of radially extending bores 48 drilled into its circumference. The edges of bores 48 form cutting surfaces which remove the offal or viscera from the belly of the fish as wheel 43 rotates. As seen in FIG. 11, there are eight bores 48 formed in each disc 47 with each bore positioned 45° apart. Of course it is readily obvious to those skilled in the art that the number and size of bores 48 is determined by the fish being processed.

As seen in FIG. 12, the space 49 between members 46 is sufficient to enable the anal fin of the fish to pass between members 46 of cleaning wheel 43, and acts as a locating point for central positioning of the fish with respect to the remaining elements of the machine.

Figure 13:
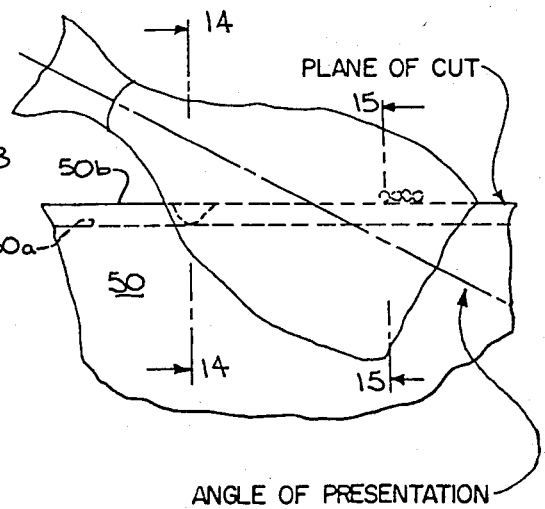
FIG. 13 is a fragmentary view in side elevation of a backbone guide horse for use with the filleting machine of FIG. 1 showing the position of a fish thereon.

After cleaning wheel 43 removes entrails from the belly, the fish is transported downstream by the belts 6 to a second guide horse 50. Guide horse 50 acts as a backbone guide means for centrally locating the backbone of the fish along the conveying path. Guide horse 50 is substantially identical to the first guide horse 39 and includes an upstanding narrow rail-like structure extending longitudinally along the conveying path. Guide horse 50 includes a locating groove 50a for positioning the fish by means of its anal fin, as seen in FIG. 14, and a pair of guide surfaces 50b on either side of groove 50a for supporting the ribs of the fish as seen in FIG. 15. It should also be noted that the upstream end of guide horse 50 forms an inclined plane with respect to the conveying path in the same manner as did guide horse 39. As the fish travels along guide horse 50, a spring-loaded holddown 51 pushes the fish down onto the top of horse 50 to help locate the anal fin and ribs into the positions shown in FIGS. 14 and 15. Holddown 51 also has a groove (not shown) to locate on the dorsal fin to ensure the top centralizing of the fish and the central location of the backbone above groove 50a. Thus, guide horse 50 ensures the correct location of the ribs and backbone and positions the fish for presentation to a pair of backbone removing blades 52. It should be noted that when the fish is in the position shown in FIG. 13, its angle of presentation is oblique to the direction of travel or conveying path and the plane of cut for the fish. This oblique angle of presentation is the optimum position for presenting the fish to the backbone removal blades 52 and rib removal blades 60.

Figure 16:
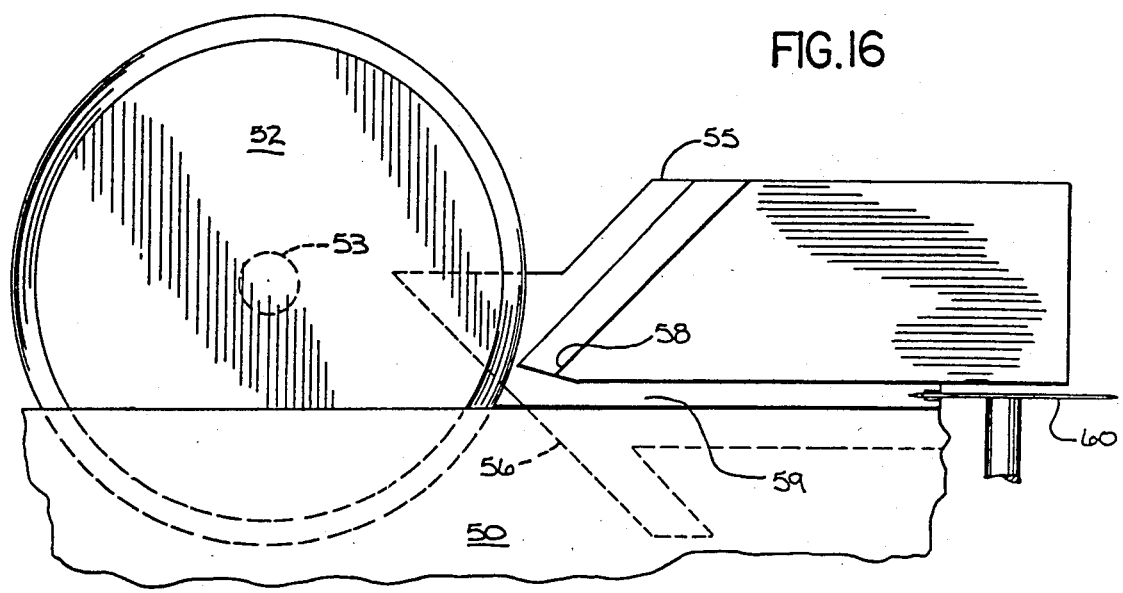
FIG. 16 is a side view in elevation of the backbone removal blades, rib pick-up assembly, and rib removal blades for use in the filleting machine of FIG. 1.
Figure 17:
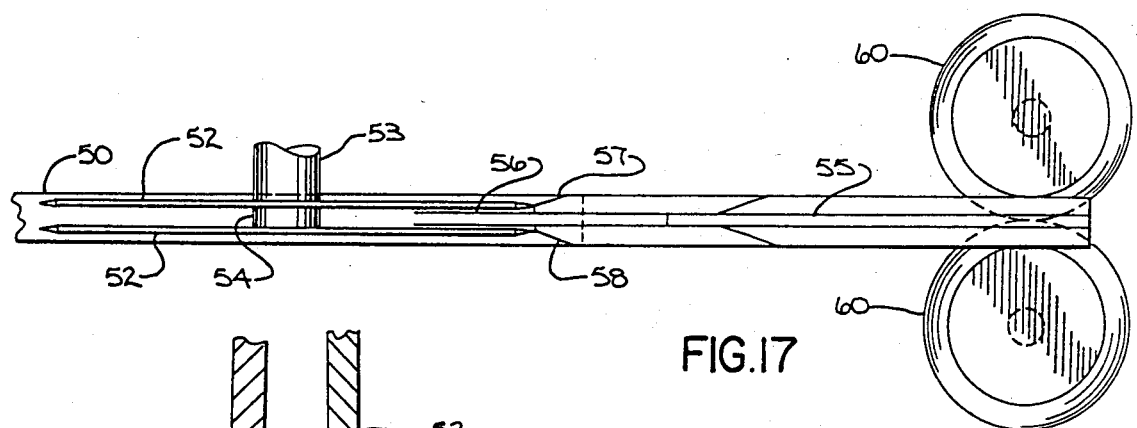
FIG. 17 is a plan view of the machine components shown in FIG. 16.
Figure 18:
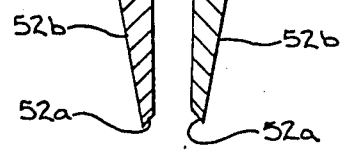
FIG. 18 is an enlarged fragmentary view of the tips of the backbone removal blades.

The backbone removal blades or splitter blades 52 are preferably comprised of stainless steel with a thickness of from about 0.070 to about 0.075 inches. The tip of each blade 52 includes a bevelled surface 52a on its inside edge and a bevelled surface 52b on its outside edge. As shown in FIG. 18, the length of surface 52a is substantially less than the length of surface 52b. In the preferred embodiment, blades 52 are about 9 inches in diameter with the length of surface 52b being about 0.56 inches and having an angle of about 9°, and surface 52a being only about 0.005 inches in length. The blades 52 are mounted on a shaft 53 for counterclockwise rotation as shown in FIGS. 1 and 16-17. The blades 52 are positioned to extend downwardly through the top of the fish to cut through the ribs on either side of the backbone. The spacing between splitter blades 52 can be adjusted by changing a spacing washer 54 located between them to correspond to the backbone size for a given range of fish.

When a fish passes through the backbone removal blades 52 it is split so that its backbone, complete with the dorsal and anal fins and tail, goes between the blades 52 and is ejected from the machine. The two halves or portions of fish are then transported downstream by the belts 6 on the outside of the blades 52. In order to conserve meat, the geometry of the backbone splitter blades 52 is such that the outside angle or bevel 52b causes the fish fillet to flex the blades 52 inwardly onto the backbone of the fish. Bevelled surface 52a of each blade 52 then allows the blade to run down or "ride" the backbone rather than cut through it. Thus, a minimum of meat is left on the backbone when it is ejected from the machine.

Each split half or portion of fish is then transported downstream by belts 6 to a rib guide means shown in FIGS. 16 and 17. The rib guide means includes a narrow, elongated rib pick-up member 55 extending longitudinally along the conveying path having a deflecting member 56 extending upstream and projecting between the splitter blades 52. Member 56 is angled downwardly so that as the backbone of a fish is being cut from the ribs by the splitter blades 52 and as the fish is being transported to the right as seen in FIGS. 16 and 17, the backbone is engaged by member 56 and deflected downwardly out of the machine. As seen in FIG. 17, member 55 includes a pair of leading edges 57 and 58 on its opposite sides that are tapered outwardly and downwardly along the conveying path. Edges 57 and 58 lead to a pair of grooves 59 formed between member 55 and the top of guide horse 50. Thus, as each split half of a fish is transported to the rib pick-up member 55 each split half will be picked up and guided by leading edge 57 or 58 to its respective groove 59 and guided by grooves 59 toward a pair of rib removal blades 60.

Rib removal blades 60 are positioned to extend laterally with respect to the conveying path. Due to the oblique angle of presentation, the path of the cut of the rib removal blades 60 will be angled with respect to the backbone of the fish. Thus, the cut will be ended just after the belly cavity at the end of the belly cut with the result that only the undesirable meat of the belly containing the ribs and pinbones will be removed and the meat of the tail section is not cut away. The shank fillet is then picked up by rollers 61 and ejected via chute 62. The belly flap containing the undesirable belly meat, ribs and pinbones will be ejected through chute 63.

A preferred embodiment of a fish filleting machine has been illustrated and described. However, it will be readily apparent to those skilled in the art that various modifications and substitutions may be made to the components described.

Various modes of carrying out the invention are contemplated as being within the scope of the following claims particularly pointing out and distinctly claiming the subject matter which is regarded as the invention.

I claim:

1. A method of filleting fish comprising the steps of making a pair of belly cuts extending longitudinally of the fish body on either side of the anal fin, positioning the fish at an oblique angle of presentation, cleaning the viscera from the belly of the fish, making a pair of backbone cuts through the ribs on either side of the fish backbone to form a pair of individual fish portions, and making a rib cut through the side of each fish portion above the ribs to provide a pair of shank fillets.

2. The method of claim 1, further including the step of raising the tail end of the fish to end the belly cuts at the anal fin.

3. The method of claim 1, further including the step of guiding the fish through the cleaning, positioning and backbone cut steps by means of the anal fin of the fish.

4. The method of claim 1, wherein the backbone cuts are made downwardly through the dorsal side of the fish.

5. The method of claim 1, further including the step of guiding the individual portions of the fish after the backbone cuts have been made by means of their ribs.

6. The method of claim 1, wherein the oblique angle of presentation is formed by positioning the ribs at the head end of the fish and the anal fin at substantially the same height.

* * * * *